United States Patent
Fitzgerald

(10) Patent No.: US 7,567,518 B2
(45) Date of Patent: Jul. 28, 2009

(54) MODELING PROTOCOL TRANSACTIONS AS FORMAL LANGUAGES WITH APPLICATIONS FOR WORKFLOW ANALYSIS

(75) Inventor: Cary W. Fitzgerald, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 599 days.

(21) Appl. No.: 11/238,916

(22) Filed: Sep. 28, 2005

(65) Prior Publication Data

US 2007/0074080 A1    Mar. 29, 2007

(51) Int. Cl.
    *G06F 11/00* (2006.01)
(52) U.S. Cl. .................... 370/241; 714/37; 714/45; 717/128
(58) Field of Classification Search ............. 370/241; 714/37, 45; 709/224; 717/128
    See application file for complete search history.

(56) References Cited

U.S. PATENT DOCUMENTS

| | | | |
|---|---|---|---|
| 6,802,054 B2 * | 10/2004 | Faraj ........................... 717/128 |
| 7,376,937 B1 * | 5/2008 | Srivastava et al. ............ 717/128 |
| 2002/0133586 A1 * | 9/2002 | Shanklin et al. .............. 709/224 |
| 2005/0177630 A1 * | 8/2005 | Jolfaei ......................... 709/224 |
| 2005/0210343 A1 * | 9/2005 | Mastro et al. ................ 714/712 |
| 2006/0090063 A1 * | 4/2006 | Theis ........................... 712/239 |
| 2006/0152754 A1 * | 7/2006 | Boyd et al. .................. 358/1.15 |

* cited by examiner

*Primary Examiner*—Min Jung
(74) *Attorney, Agent, or Firm*—Marger Johnson & McCollom PC

(57) ABSTRACT

A service grammar can be defined in Backus Naur Form for a protocol. The service grammar can be compiled into a service analyzer, which can identify services from a trace of messages sent using the protocol. Similarly, a workflow grammar can be defined for services implemented using the protocol (a meta-grammar). The workflow grammar can be compiled into a workflow analyzer, which can identify workflows from the services (and therefore, indirectly from the trace). This workflow information can be used to define actions for a User Agent (UA) that can act on behalf of a person. The UA can be validated using the service analyzer and workflow analyzer to verify that the UA is acting correctly.

29 Claims, 9 Drawing Sheets

MODELING PROTOCOL TRANSACTIONS AS FORMAL LANGUAGES WITH APPLICATIONS FOR WORKFLOW ANALYSIS

FIELD

This invention pertains to protocol transactions, and more particularly to generating workflow analysis from transactions and/or applications customized to the workflow.

BACKGROUND

Often, users of networks need to accomplish transactions. For example, one user might want to transfer a file across the network: such a transfer is an example of a transaction. These transactions are handled by using messages. Often, a single message does not suffice to complete a particular transaction. In tracking what the protocol actually performs, a person has to look at the messages used, and from that attempt to decipher exactly what happened. This is a time-consuming, labor-intensive process, and is prone to error.

The present invention addresses these and other problems associated with the prior art.

SUMMARY

One embodiment of the invention includes a service grammar. The service grammar defines sequences of elements that, in combination, identify services. The service grammar can be defined using Backus Naur Form (BNF). The service grammar can then be used to construct a service analyzer. The service analyzer can then be used to process a trace to automate identification of services in the trace.

In another embodiment, the services resulting from the analysis of the trace can themselves be analyzed to identify workflows. A workflow grammar can be defined in BNF, from which a workflow analyzer can be constructed. The workflow analyzer can process the services (e.g., resulting from the service analyzer analysis of the trace) to identify workflows.

In yet another embodiment of the invention, a User Agent (UA) grammar can be defined. The UA grammar can then be used to construct a UA. The UA can then be used to analyze or take actions at one end of a transaction. The UA can also be used to implement workflows from one end of the transaction. Finally, the embodiments of the invention can work together, so that a trace resulting from actions taken by a UA can be verified using the service analyzer and/or workflow analyzer.

The foregoing and other features, objects, and advantages of the invention will become more readily apparent from the following detailed description, which proceeds with reference to the accompanying drawings.

DETAILED DESCRIPTION

Figure 1:
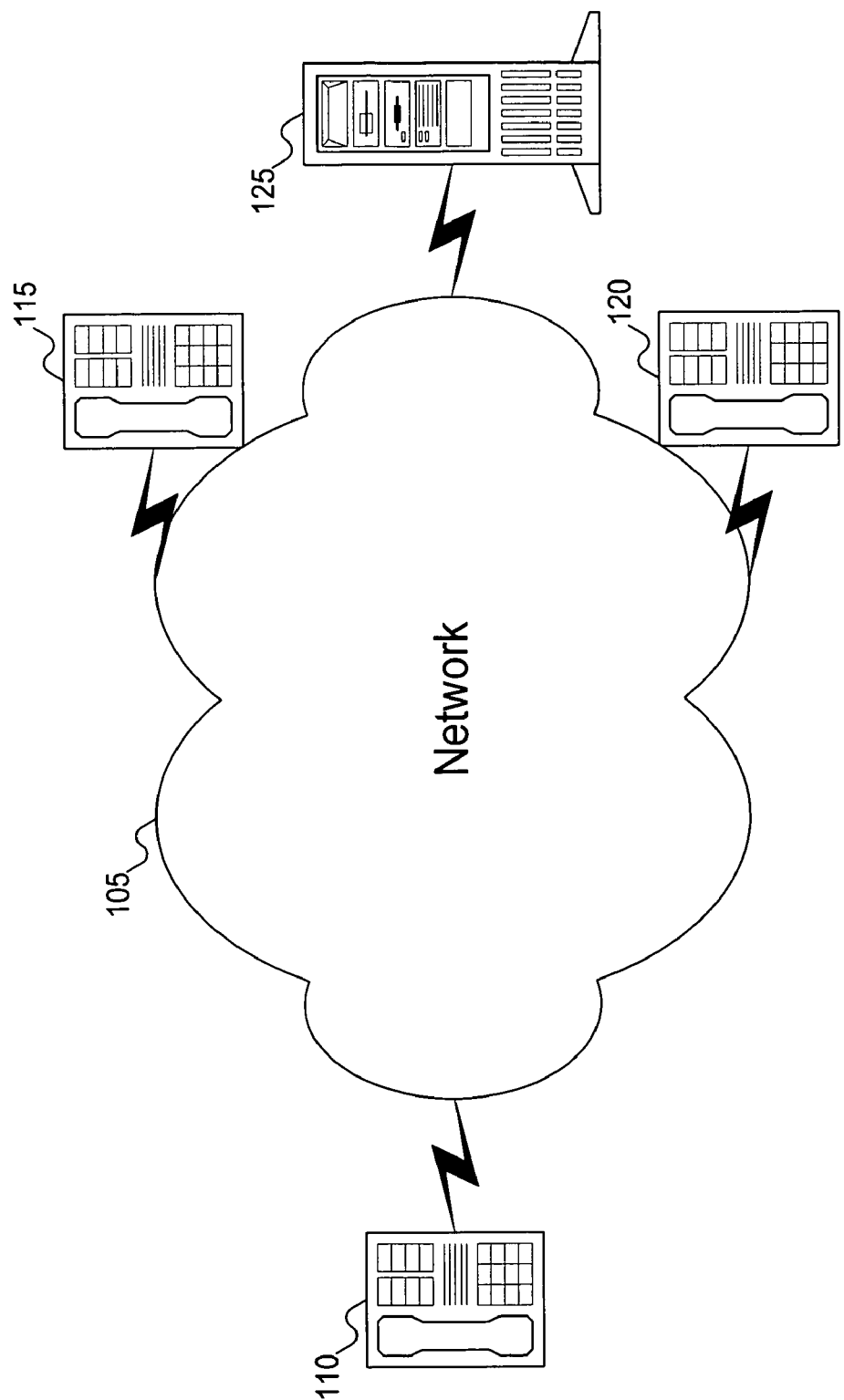
FIG. 1 shows a network with devices capable of communicating with each other, according to an embodiment of the invention.

FIG. 1 shows a network with devices capable of communicating with each other, according to an embodiment of the invention. In FIG. 1, network 105 connects a number of devices. In FIG. 1, these devices include phones 110, 115, and 120. Although FIG. 1 shows network 105 interconnecting three such phones, a person skilled in the art will recognize that network 105 can interconnect any number of devices. In addition, a person skilled in the art will recognize that network 105 can interconnect devices of differing types. So, although not shown in FIG. 1, network 105 can also interconnect other devices, such as scanners, printers, copiers, computers, etc. In addition, a person skilled in the art will recognize that network 105 can take any form. For example, network 105 can include a local area network (LAN), a wide area network (WAN), a metropolitan area network (MAN), or a global network such as the Internet. Finally, a person skilled in the art will recognize that network 105 can also be a wired network, a wireless network, or a combination thereof, and can include a virtual private network (VPN).

Devices 110, 115, and 120 can communicate with each other (and with other devices on network 105) using protocols. One such protocol that can be used by phone devices 110, 115, and 120 is Session Initiation Protocol (SIP). SIP is a signaling protocol for use on networks such as those described above. While the remainder of this document will focus on SIP as the protocol being used by phones 110, 115, and 120, a person skilled in the art will recognize that embodiments of the invention are equally applicable to other protocols whose transactions can be equivalently analyzed, and that embodiments of the invention are not limited to phone devices.

Figure 2:
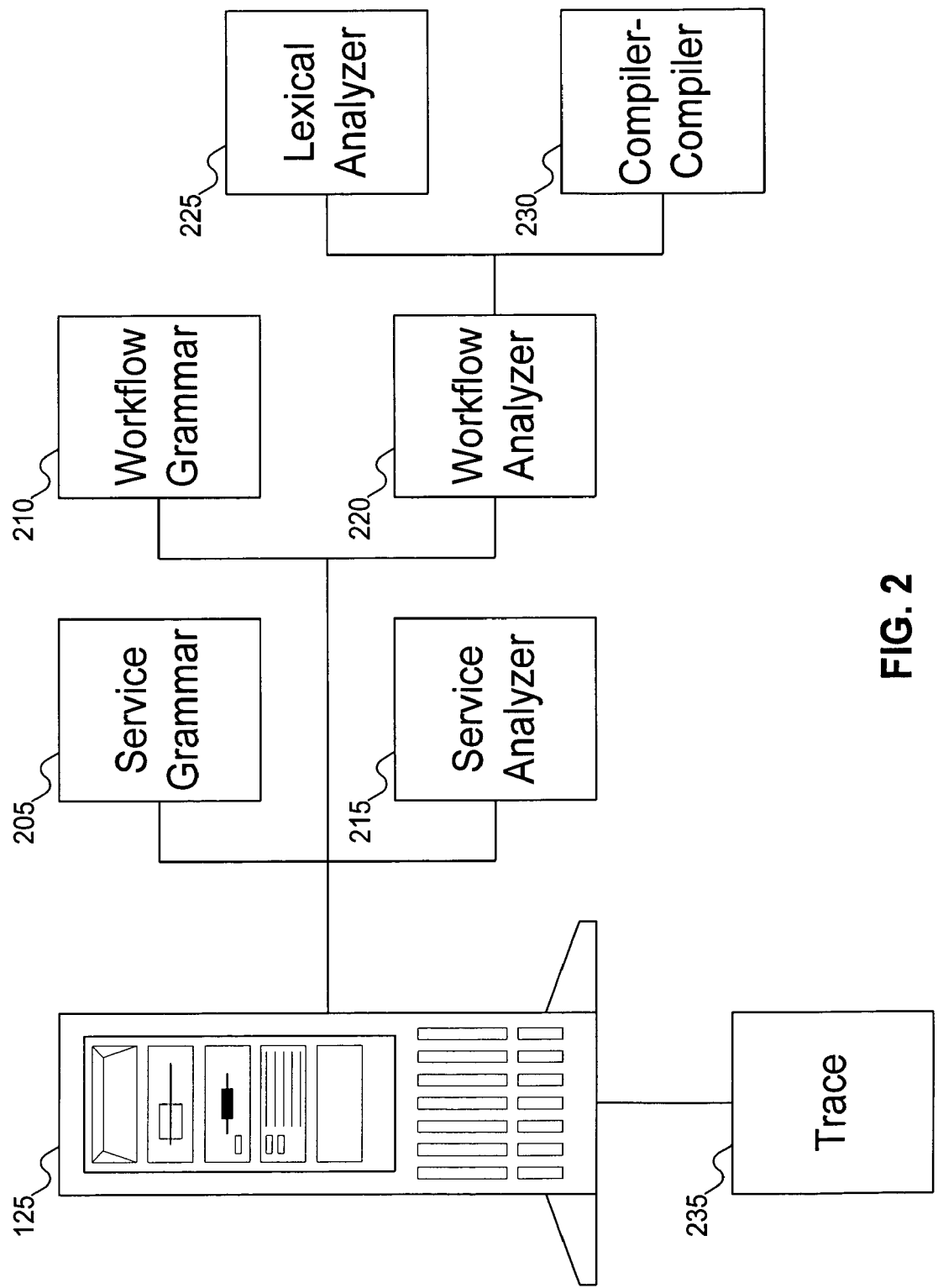
FIG. 2 shows a server of FIG. 1 equipped to support construction of a service analyzer and/or a workflow analyzer.

FIG. 1 also shows server 125. Server 125 can be used to perform analysis of the SIP trace, and can be used to construct the various compilers used in embodiments of the invention. FIG. 2 shows more details about server 125. In FIG. 2, server 125 includes various components. Typically, these components are implemented as software. But a person skilled in the art will recognize that these components could be implemented in firmware, or even hardware, although embodiments that rely on firmware or hardware are more cumbersome to use with respect to certain features (e.g., modifying the grammar).

Among the components server 125 includes are grammars 205 and 210, and analyzers 215 and 220. Grammars 205 and 210 are used to construct analyzers 215 and 220. For example, lexical analyzer 225 and compiler-compiler 230 can be used to process grammars into analyzers. While lexical analyzer 225 and compiler-compiler 230 are specifically shown as used in constructing workflow analyzer 220, a person skilled in the art will recognize that such tools can be used with any grammar to construct an analyzer. Thus, lexical analyzer 225 and compiler-compiler 230 are not unique to the construction of workflow analyzer 220. Well-known examples of programs that can be used as lexical analyzer 225 and compiler-compiler 230, without limiting the embodiments of the invention, include lex and yacc, respectively. A person skilled in the art will also recognize other programs that can be used as lexical analyzer 225 and compiler-compiler 230.

Grammars, such as grammars 205 and 210, can be defined using Backus Naur Form (BNF). BNF is a well-known form for defining grammars, using terminals and non-terminals to define which sequences of symbols (also called tokens) are acceptable and which sequences are not. Nevertheless, a person skilled in the art will recognize that grammars can be defined using notations other than BNF. Not shown in FIG. 2, but understood by a person skilled in the art, is code that implements desired actions when an acceptable sequence of tokens is found. Such code is usually processed by compiler-compiler 230, but a person skilled in the art will recognize other ways in which such code can be implemented.

Service grammar 205 defines the grammar for identifying services from a trace, such as trace 235. Trace 235 stores a listing of messages generated by the SIP protocol, which have been captured from the network. In other words, trace 235 is a capture of the type of information being sent using the protocol. Trace 235 could be captured anywhere on the network: e.g., at one of the devices, or somewhere between the devices. For purposes of the discussion below, trace 235 will be considered to store information about messages between only two devices, but a person skilled in the art will recognize that trace 235 could store information about multiple transactions between multiple devices, and not limited to messages between exactly two devices.

Once processed by an appropriate lexical analyzer and compiler-compiler, service analyzer 215 results. Service analyzer 215 is then capable of accessing the elements of trace 235 and determining whether there are any recognized services in trace 235 (that is, whether there are recognized sequences of elements that correspond to services as defined in grammar 205). In other words, service analyzer 215 "compiles" the source code of trace 235.

Workflow grammar 210 is defined similarly to service grammar 205. But instead of identifying individual elements of trace 235, workflow grammar 210 defines a workflow as a sequence of services. In other words, workflow grammar 210 can be thought of as a meta-grammar relative to trace 235. In one embodiment, workflow grammar 210 uses services as terminals in the grammar. In such an embodiment of the invention, workflow grammar 210 does not directly access trace 235, but rather processes a sequence of services as might be output from service analyzer 215: workflow analyzer 225 "compiles" the "source code" produced by service analyzer 215. But a person skilled in the art will recognize that workflow grammar 210 can be defined to use messages as terminals. In such an embodiment, the services could be defined in workflow grammar 210 as additional non-terminals, with their own further definitions (similar to those used in service grammar 205). This would enable workflow analyzer 220 to operate directly on trace 235, without needing trace 235 to first be processed by service analyzer 215.

As suggested above, trace 235 can include communications between more than two devices. Although service grammar 215 (and perhaps workflow grammar 220) can be designed to handle this complication, another solution is to pre-process trace 235 to group together related messages to different devices. For example, in the SIP protocol, it is possible to fork transactions to multiple different devices. Messages associated with each fork would be stored in trace. The pre-processor can identify the messages relating to each different fork of the transaction, and replace those messages with messages identifying the start of the fork and its final result. By pre-processing the trace in this manner, service analyzer 215 (and possibly workflow analyzer 220) does not have to concern itself with handling the fact that messages relating to the different forks of the transaction could be interleaved.

At this point, it might be useful to explain what is meant by the terms service and workflow. Again, referring to SIP, an example of a service is a basic call setup. This service can include four messages: INVITE, 180-Ringing, 200-OK, and ACK. Each of these messages is represented in the trace when a basic call setup is completed. The combination of these messages (in this particular order) can represent a basic call setup. Thus, upon finding this combination of messages in trace 235, service analyzer 215 can report (e.g., by outputting to the screen, printer, or another file) that a basic call setup service was identified.

On the other hand, a workflow is a combination of services. For example, one sequence of services that could constitute a workflow might include a transfer of a call to a supervisor, a conference with accounting, a transfer to marketing, parking the call, and ending the call. Such a sequence could represent an accounts receivable problem call. Thus, a person skilled in the art will recognize that a service is a sequence of messages in the trace, and a workflow is a sequence of services from the trace (or, alternatively, a longer sequence of messages in the trace).

While FIG. 2 shows server 125 as storing all of the elements shown in FIG. 2, a person skilled in the art will recognize that not all of these elements are needed at any given time, and could be stored elsewhere (if at all). For example, once service analyzer 215 is constructed, service grammar 205 is not needed. Thus, service grammar 205 could be removed from server 125. Of course, if service grammar 205 were removed from server 125 and later needed, it would have to be rebuilt from scratch. Given that modifying service grammar 205 can be useful (e.g., to allow service analyzer 215 to recognize a new service), it is useful to retain service grammar 205. The same is true for workflow grammar 210, lexical analyzer 225, and compiler-compiler 230.

One use for service analyzer 215 and workflow analyzer 220 is to verify that things are working correctly. For example, if service analyzer 215 encounters a sequence of elements that it cannot match up using grammar 205, then one of two situations has arisen. Either an incorrect sequence of messages was generated (in which case that part of the trace does not represent a service), or a service that is not recognized by service analyzer 215 has been encountered. In the former situation, service analyzer 215 can indicate that there was a problem. In the latter situation, grammar 205 can be modified to recognize the new service, and compiler 215 can be re-constructed from the modified grammar. (This same logic applies to workflow grammar 210 and workflow analyzer 220.)

Another use for service analyzer 215 and workflow analyzer 220 is to verify that things are working in an optimal manner. For example, a workflow might show that a call is transferred to one person (e.g., marketing department), and is then immediately transferred to another person (e.g., customer service department). While this might be correct given the current workflow definition, the involvement of the marketing department might be unnecessary, since the marketing department might not be contributing to the resolution of the call. In that case, the workflow could be improved by skipping the transfer to the marketing department, and immediately transferring the call to the customer service department. Workflow analyzer 220 can be used to identify this inefficiency, so that workflows can be improved.

Although not shown in FIG. 2, server 125 is also capable of using the same techniques described above to construct a compiler for a User Agent (UA). A UA is an agent that can act on behalf of a user with respect to a device (such as those shown in FIG. 1). The primary difference between the grammar used to define a UA and service grammar 205 is that the UA grammar operates at one end of the connection, rather than somewhere in the middle. This means that the UA grammar can include terminals that represent actions taken by a user. For example, if a user wants to initiate a call (that is, make an outbound call from a phone), the sequence of steps is to take the phone off hook, dial the first digit of the telephone number, and dial the remainder of the telephone number. (There can be any number of reasons for separating the first digit from the rest of the telephone number. For example, the first digit can be a cue specifying an outside line, which might mean a different number of digits is being dialed than would be dialed for an internal telephone number.) All of these actions are taken by a user, and would not be represented in a trace, such as trace 235. But such actions can affect how a UA would operate: the UA would need to replicate these actions. Thus, the UA grammar would include actions that would otherwise be taken by a user. (The actions programmed into the UA would similarly include actions otherwise taken by a user.) But once defined, the UA grammar can be used to construct a UA in much the same way as service analyzer 215 and workflow analyzer 220.

In addition, once the UA grammar is defined, actions for the UA can be defined. For example, given a particular workflow (such as one identified by workflow analyzer 220), the UA can implement that workflow.

Figure 3:
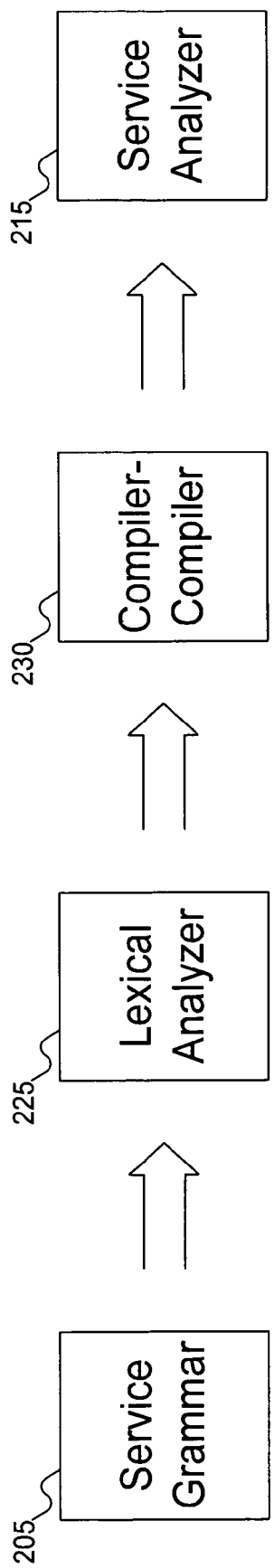
FIG. 3 shows the sequence of steps to construct one of the analyzers of FIG. 2.

FIG. 3 shows the sequence of steps to construct one of the compilers of FIG. 2. As shown, a grammar, such as service grammar 205, is used as an input to lexical analyzer 225. The output of lexical analyzer 225 is then input to compiler-compiler 230, which produces service analyzer 215.

Figure 4:
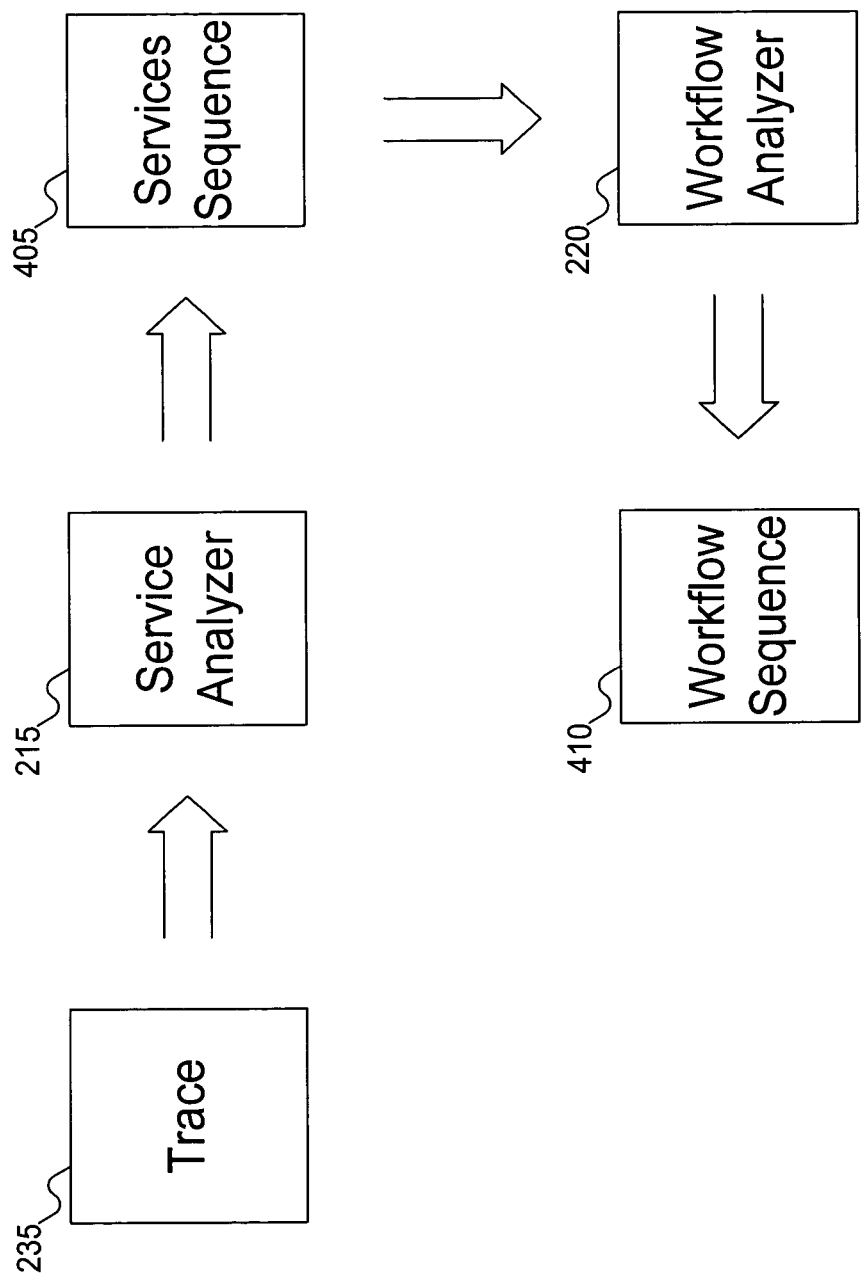
FIG. 4 shows the use of the analyzers of FIG. 2 to analyze a trace.

FIG. 4 shows the use of the compilers of FIG. 2 to analyze a trace. As discussed above with reference to FIG. 2, trace 235 can be processed first by service analyzer 215, whose output is then processed by workflow analyzer 220 to produce a sequence of workflows. This sequence is explained in FIG. 4. Trace 235 is input to service analyzer 215, which produces service sequence 405. A person skilled in the art will recognize that service sequence 405 is just that: a sequence of services as recognized by service analyzer 215. Service sequence 405 can then be analyzed by workflow analyzer 220, which generates workflow sequence 410: a sequence of recognized workflows.

Figure 5:
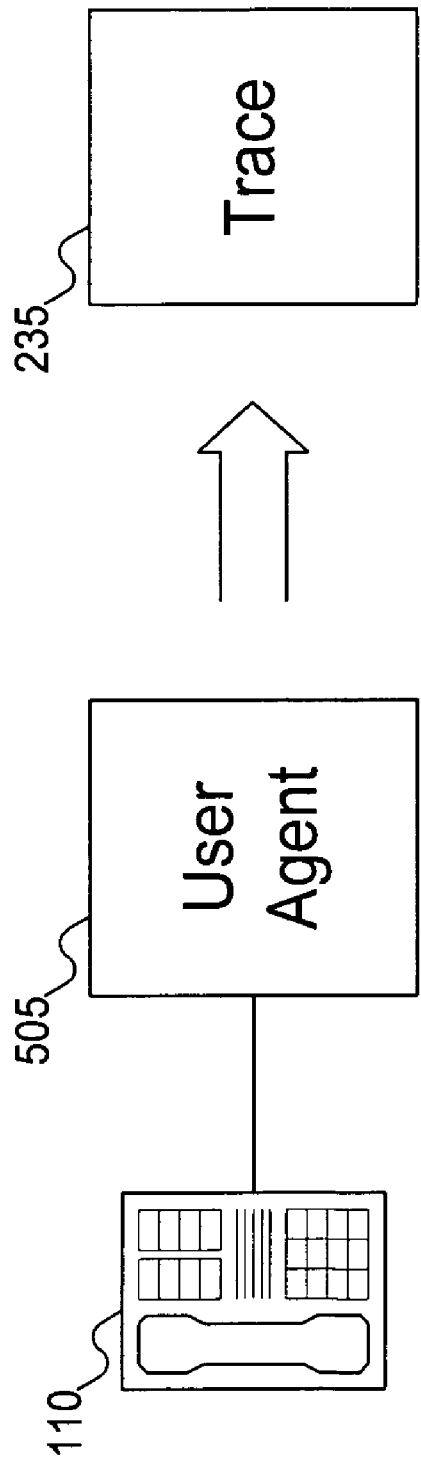
FIG. 5 shows one of the devices of FIG. 1 with a User Agent (UA) used in generating a trace.

FIG. 5 shows one of the devices of FIG. 1 with a User Agent (UA) used in generating a trace. In FIG. 5, phone 110 is used in conjunction with UA 505. UA 505 can act on the user's behalf, carrying out actions that the user would otherwise have to do for himself. Those actions that result in messages could then be captured in trace 235.

By having trace 235 capture the messages that result from the actions of UA 505, embodiments of the invention come full circle. Specifically, the service analyzer recognizes services from the elements of trace 235. These services are then analyzed by workflow analyzer, which recognizes workflows. UA 505 can then be programmed to execute the workflows. The resulting actions captured in trace 235 can then be used to verify that UA 505 did, in fact, carry out the workflows correctly.

Figure 6A:
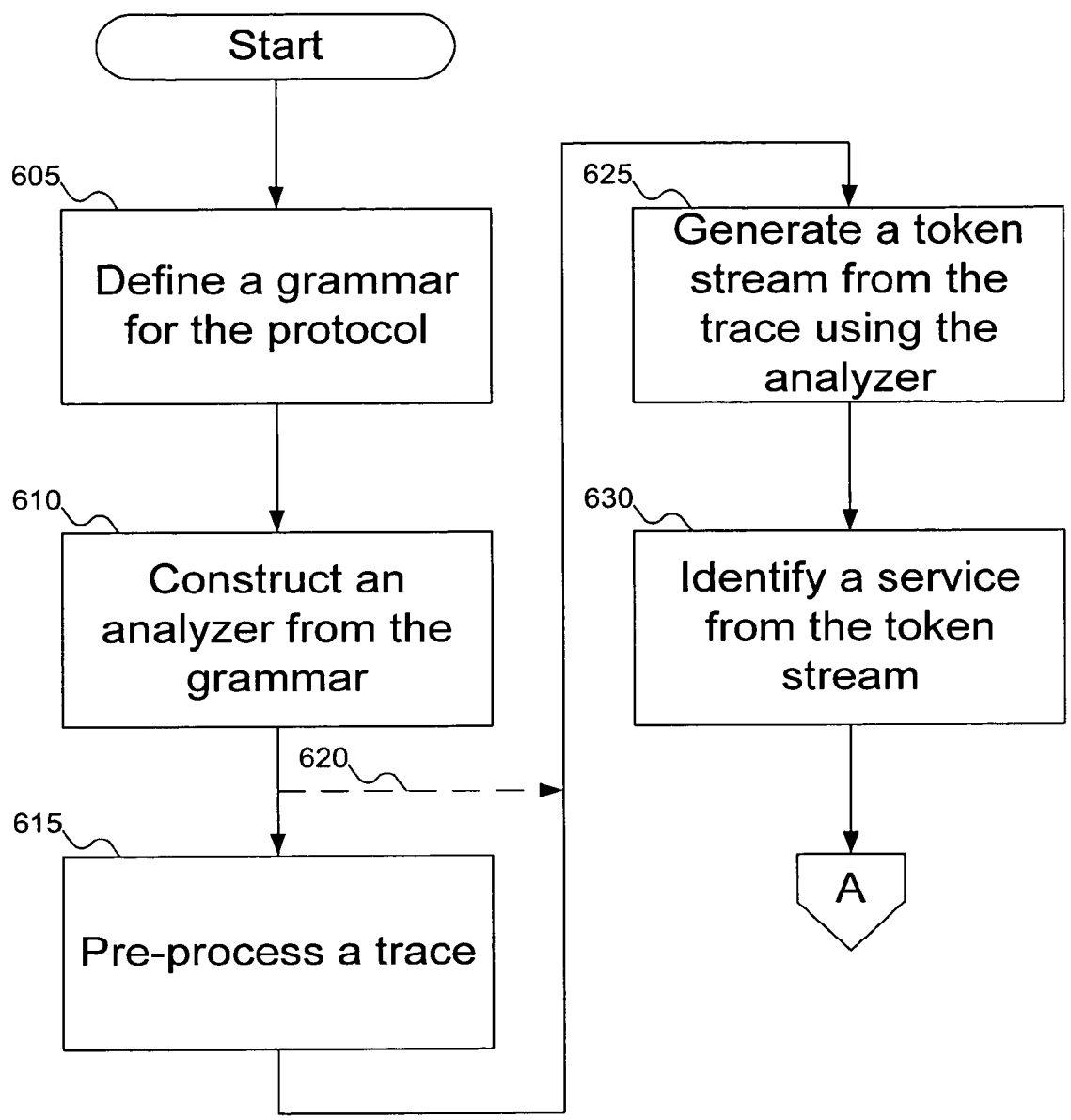
FIGS. 6A-6B show a flowchart of the procedure used to construct one of the analyzer of FIG. 2 and to analyze a trace.
Figure 6B:
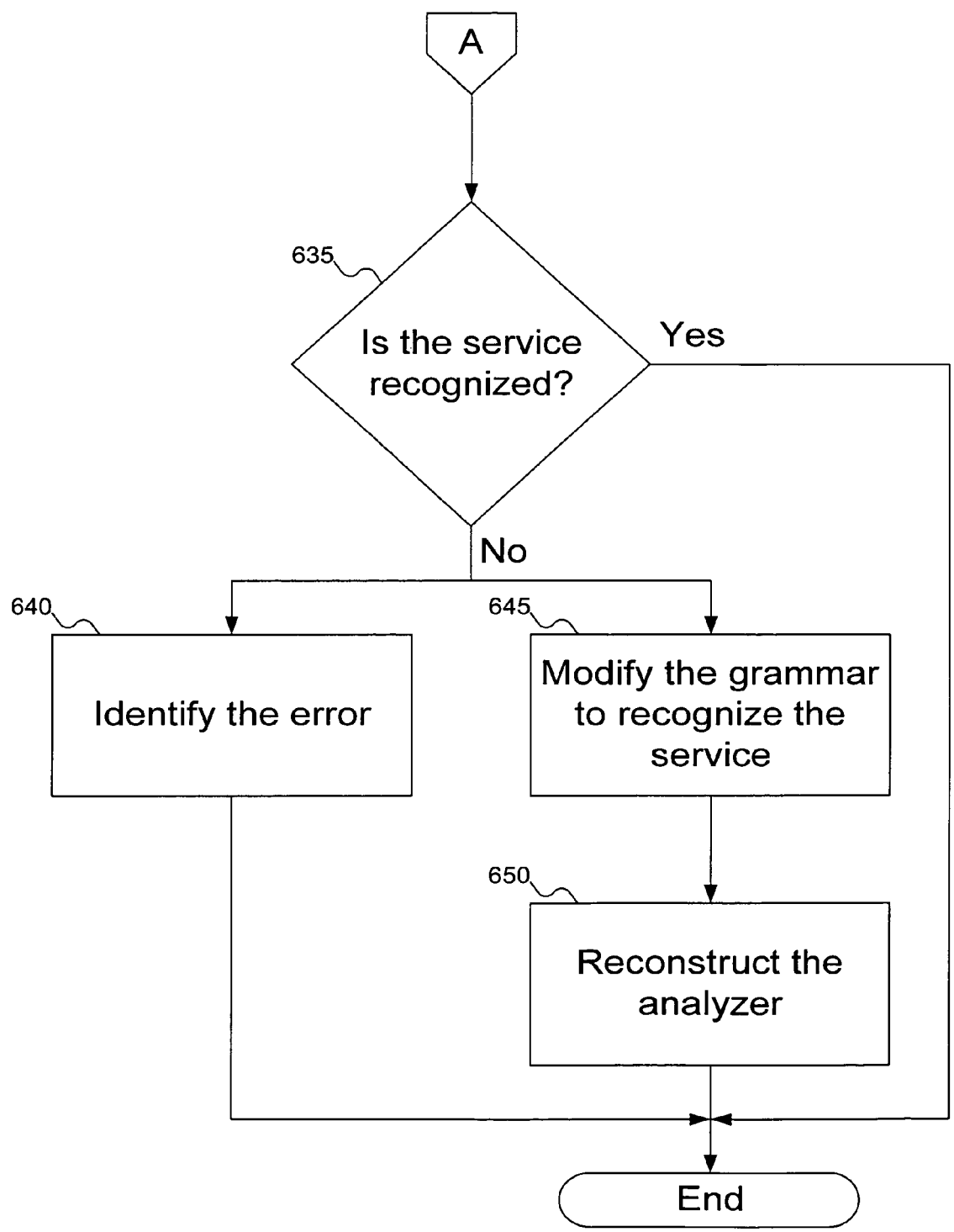

FIGS. 6A-6B show a flowchart of the procedure used to construct one of the compilers of FIG. 2 and to analyze a trace. In FIG. 6A, at step 605, a grammar is defined for a protocol. At step 610, the grammar is used to construct a compiler. At step 615, a trace is pre-processed. As discussed above with reference to FIG. 2, pre-processing the trace simplifies the compiler logic for a trace that involves messages between more than two devices. If pre-processing is not needed, then step 615 can be omitted, as shown by arrow 620. At steps 625-630, the compiler acts on the trace. The compiler converts the trace into a token stream (step 625), from which a service can be identified (step 630).

At step 635 (FIG. 6B), the service analyzer can check to see if the sequence of elements in the trace are recognized as a valid service. If not, then either the error can be identified (step 640), or alternatively, the grammar can be modified to recognize the new service (step 645), after which the compiler can be re-constructed (step 650).

Figure 7:
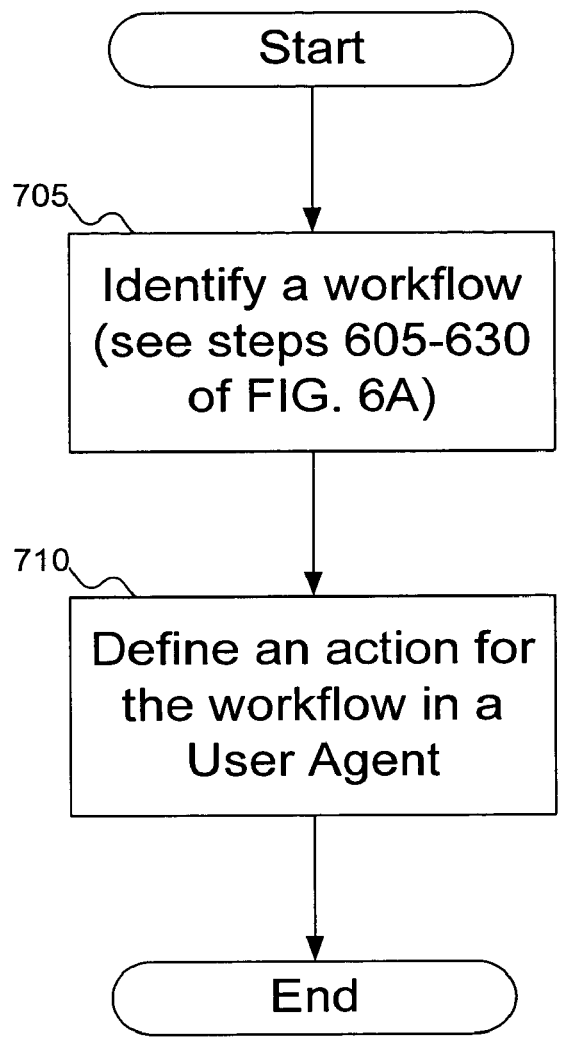
FIG. 7 shows a flowchart of the procedure used to construct a UA from information about workflows in the trace of FIG. 2.

While FIGS. 6A-6B are described with reference to the service grammar and service analyzer, a person skilled in the art will recognize that FIGS. 6A-6B can be easily modified to describe the workflow grammar and workflow analyzer, or the grammar/compiler used to construct a UA. But for a UA, should be defined for particular workflows, so that the UA can properly mimic the actions of a person. FIG. 7 shows a flowchart of the procedure used to construct a UA from information about workflows in the trace of FIG. 2. To provide the programming for the UA, at step 705 the workflows are determined from the trace. This is accomplished by analyzing the trace for workflows, as described above with reference to steps 605-630 of FIG. 6A. Then, actions can be defined for these workflows, as described at step 710, and then programmed into the compiler for the UA.

Figure 8:
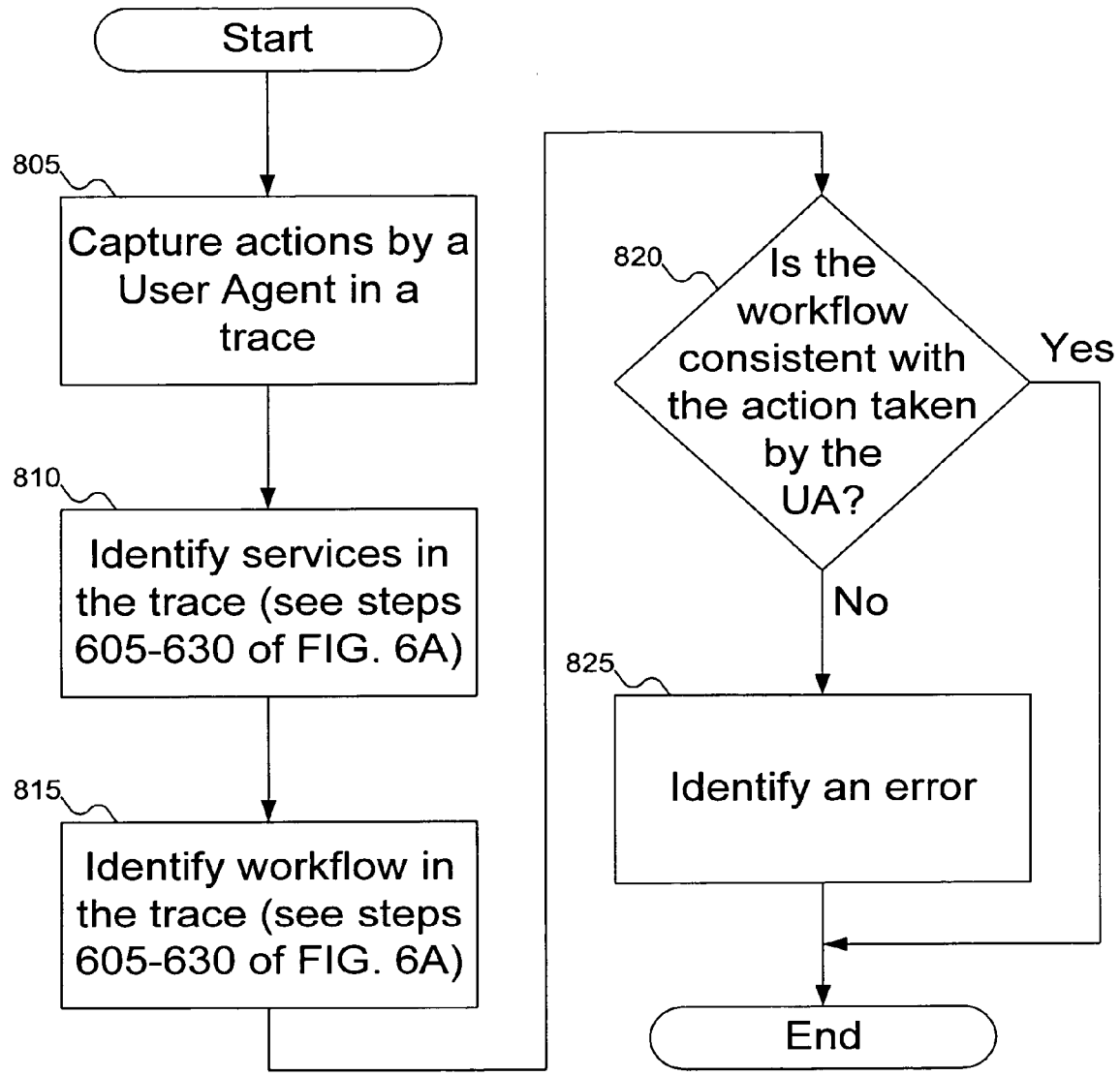
FIG. 8 shows a flowchart of the procedure to verify that the UA of FIG. 5 is operating correctly.

FIG. 8 shows a flowchart of the procedure to verify that the UA of FIG. 5 is operating correctly. At step 805, actions taken by the UA can be captured in a trace. At step 810, services in the trace can be identified by the service analyzer, as described above with reference to steps 605-630 of FIG. 6A. At step 815, the services can then be analyzed by the workflow analyzer to identify workflows, again as described above with reference to steps 605-630 of FIG. 6A. At step 820, the workflows so identified are compared with the action taken by the UA. If there is an inconsistency, then at step 825, an error can be identified. These conditions signal that either a workflow is inconsistent with policy or that an unidentified workflow might need further study.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments. Descriptions of the embodiments by reference to Linux are illustrative; the invention can be used with other operating systems and software distributions.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   a trace, including a sequence of elements for a protocol; and
   a service analyzer to process the trace to identify at least one service in the trace, the at least one service in the trace including a plurality of the elements.

2. An apparatus according to claim 1, wherein:
   the trace includes an SIP trace; and
   the service analyzer is operative to process the SIP trace to identify at least one service in the SIP trace.

3. An apparatus according to claim 1, wherein:
   the apparatus further comprises a service grammar in Backus Naur Form (BNF) for the protocol;
   the service analyzer is constructed from the service grammar; and
   each element in the trace includes one or more tokens in the service grammar.

4. An apparatus according to claim 1, further comprising a pre-processor to pre-process the trace prior to the service analyzer processing the trace, to group together related elements.

5. An apparatus according to claim 1, further comprising a workflow analyzer operative to process the services in the trace to identify a workflow, the workflow including a plurality of services.

6. An apparatus according to claim 5, wherein:
   the apparatus further comprises a workflow grammar for a meta-protocol in BNF; and
   the workflow analyzer is constructed from the workflow grammar.

7. An apparatus, comprising:
   a User Agent compiler to process the trace to identify at least one service in the trace, the at least one service in the trace including a plurality of elements in the trace; and
   a User Agent (UA) defined using the User Agent compiler, the UA including an action to be taken if a workflow occurs, the workflow including a plurality of services.

8. An apparatus according to claim 7, wherein:
   the apparatus further comprises a User Agent grammar for the UA in Backus Naur Form (BNF), the User Agent grammar including at least a first terminal defined by a user action and a second terminal defined by a device action; and
   the User Agent compiler is constructed from the User Agent grammar.

9. An apparatus according to claim 7, further comprising:
   a trace generated by the UA, the trace including a sequence of events;
   a service analyzer to process the trace to identify at least one service in the trace;
   a workflow analyzer operative to process the services in the trace to identify a workflow; and
   a verifier to verify that the workflow corresponds to an action taken by the UA.

10. An apparatus for identify services in a protocol, comprising:
    means for defining a service grammar for the protocol in Backus Naur Form (BNF);
    means for constructing a service analyzer from the service grammar; and
    means for processing a trace using the service analyzer to identify at least one service in the trace, the at least one service in the trace including a plurality of elements in the trace, and each element in the trace includes one or more tokens in the service grammar.

11. An apparatus according to claim 10, further comprising:
    means for defining a workflow grammar for a meta-protocol in BNF;
    means for constructing a workflow analyzer from the workflow grammar; and
    means for processing the services in the trace using the workflow analyzer to identify at least one workflow in the trace, the at least one workflow in the trace including a plurality of services.

12. A method for identify services in a protocol, comprising:
    defining a service grammar for the protocol in Backus Naur Form (BNF);
    constructing a service analyzer from the service grammar; and
    processing a trace using the service analyzer to identify at least one service in the trace, the at least one service in the trace including a plurality of elements in the trace and each element in the trace includes one or more tokens in the service grammar.

13. A method according to claim 12, wherein:
defining a service grammar for the protocol includes defining a service grammar for SIP in BNF; and
processing a trace includes processing an SIP trace using the service analyzer to identify the at least one service in the SIP trace.

14. A method according to claim 12, wherein processing a trace includes:
using the service analyzer to generate a token stream from the trace; and
identifying the at least one service in the token stream using the service analyzer.

15. A method according to claim 12, further comprising verifying that the trace includes only recognized services.

16. A method according to claim 12, further comprising identifying a sequence of elements in the trace that does not correspond to a service.

17. A method according to claim 16, further comprising:
modifying the service grammar to recognize the sequence of elements as a new service; and
reconstructing the service analyzer from the modified service grammar.

18. A method according to claim 16, further comprising identifying the sequence of elements in the trace as an error.

19. A method according to claim 12, further comprising pre-processing the trace to combine at least two elements in the trace into a single element.

20. A method according to claim 12, further comprising:
defining a workflow grammar for a meta-protocol in BNF;
constructing a workflow analyzer from the workflow grammar; and
processing the services in the trace using the workflow analyzer to identify at least one workflow in the trace, the at least one workflow in the trace including a plurality of services.

21. A method according to claim 20, further comprising identifying a sequence of services that does not correspond to a workflow.

22. A method according to claim 21, further comprising:
modifying the workflow grammar to recognize the sequence of services as a new workflow; and
reconstructing the workflow analyzer from the modified workflow grammar.

23. A method according to claim 21, further comprising identifying the sequence of services as an error.

24. A method for constructing a User Agent (UA), comprising:
defining a User Agent grammar for the UA in Backus Naur Form (BNF), the User Agent grammar including at least a first terminal defined by a user action and a second terminal defined by a device action; and
constructing a User Agent compiler from the User Agent grammar, including defining an action for the UA to take given a workflow including a particular sequence of services.

25. A method according to claim 24, wherein defining an action for the UA includes:
defining a service grammar for a protocol in Backus Naur Form (BNF);
constructing a service analyzer from the service grammar;
processing a trace using the service analyzer to identify at least one service in the trace;
defining a workflow grammar for a meta-protocol in BNF;
constructing a workflow analyzer from the workflow grammar;
processing the services in the trace using the workflow analyzer to identify a workflow in the trace; and
defining an action for the UA to take if the workflow occurs.

26. A method according to claim 25, wherein:
defining a service grammar for a protocol includes defining a service grammar for SIP In BNF; and
processing a trace includes processing an SIP trace using the service analyzer to identify the at least one service in the SIP trace.

27. A method according to claim 25, further comprising:
identifying a second trace including elements from the UA;
processing the second trace using the service analyzer to identify at least one service in the second trace;
processing the services in the second trace using the workflow analyzer to identify a second workflow in the second trace; and
verifying that the second workflow corresponds to an action taken by the UA.

28. An article comprising:
a storage medium, said storage medium having stored thereon instructions, that, when executed by a machine, result in:
defining a User Agent grammar for a User Agent (UA) in Backus Naur Form (BNF), the User Agent grammar including at least a first terminal defined by a user action and a second terminal defined by a device action; and
constructing a User Agent compiler from the User Agent grammar, including defining an action for the UA to take given a workflow including a particular sequence of services.

29. An article according to claim 28, wherein defining an action for the UA includes:
defining a service grammar for a protocol in Backus Naur Form (BNF);
constructing a service analyzer from the service grammar;
processing a trace using the service analyzer to identify at least one service in the trace;
defining a workflow grammar for a meta-protocol in BNF;
constructing a workflow analyzer from the workflow grammar;
processing the services in the trace using the workflow analyzer to identify a workflow in the trace; and
defining an action for the UA to take if the workflow occurs.

* * * * *